J. N. WHEELER.
CHILD'S SULKY.
APPLICATION FILED FEB. 28, 1911.
1,062,867.
Patented May 27, 1913.
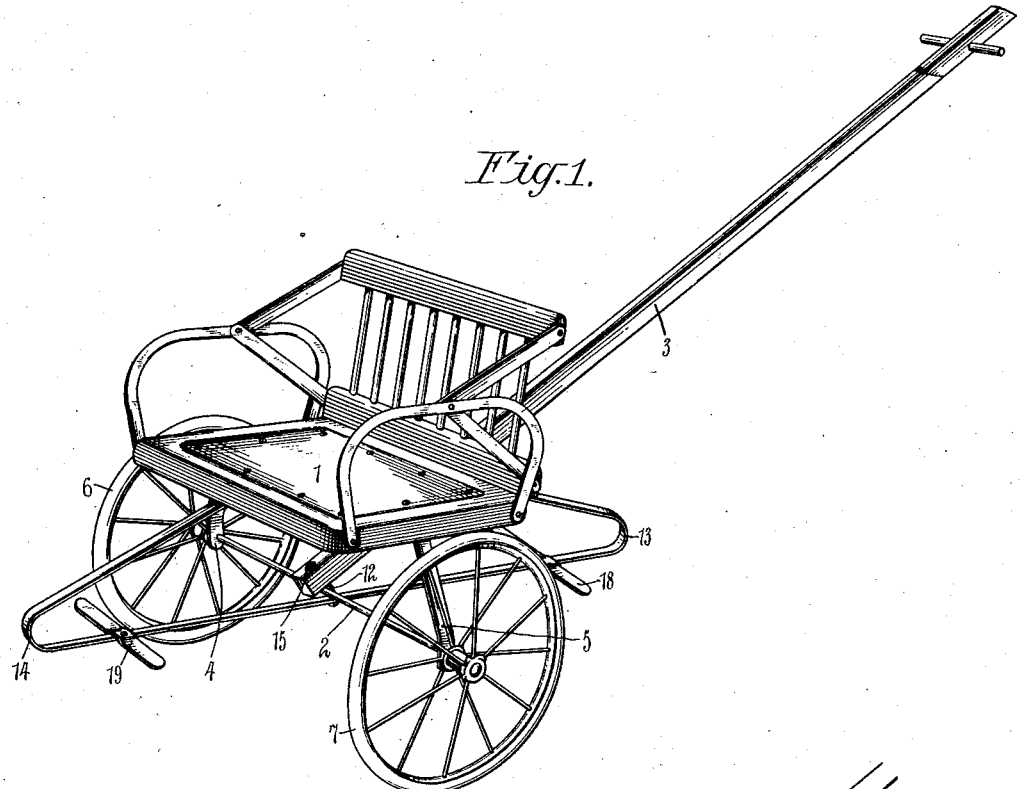
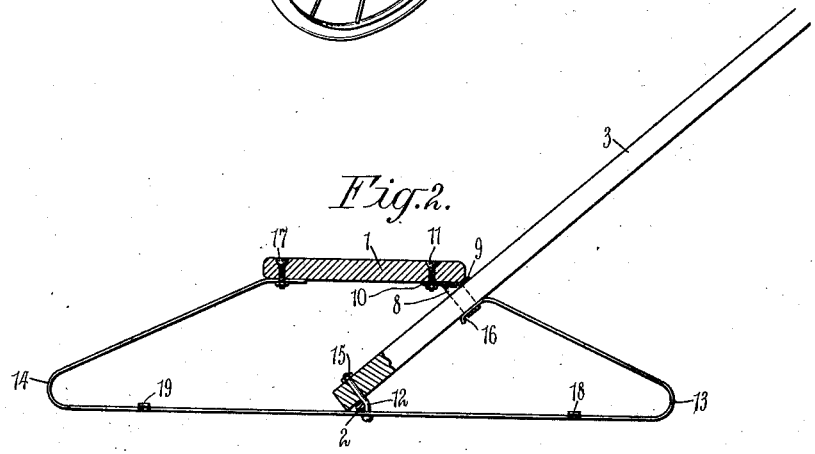
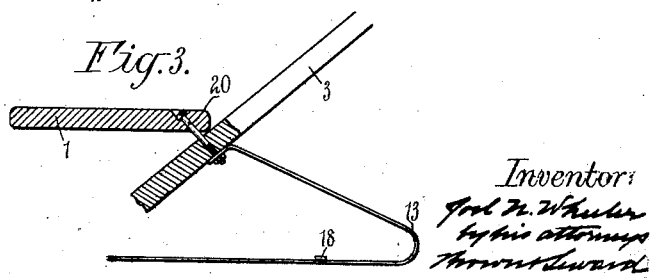

UNITED STATES PATENT OFFICE.

JOEL N. WHEELER, OF GENEVA, ILLINOIS.

CHILD'S SULKY.

1,062,867.

Specification of Letters Patent. Patented May 27, 1913.

Application filed February 28, 1911. Serial No. 611,498.

*To all whom it may concern:*

Be it known that I, JOEL N. WHEELER, a citizen of the United States, and resident of Geneva, in the county of Kane and State of Illinois, have invented a new and useful Child's Sulky, of which the following is a specification.

My invention relates to a child's sulky and more particularly to the structure which connects the seat with the axle, the object being to provide simple and effective means for holding the seat, axle and tongue in their relative operative positions and at the same time provide for shipping the sulky in a complete knock-down condition.

A practical embodiment of my invention is represented in the accompanying drawings, in which, Figure 1 is a view of the sulky in perspective as it appears in use, Fig. 2 is a view in side elevation, the wheels and upper portion of the seat being removed, and Fig. 3 is a partial view in side elevation, showing a modified structure.

The bottom of the seat is denoted by 1, the axle by 2, and the tongue by 3. The seat bottom 1 is connected with the axle 2, by an arch or yoke, the bight of which is fastened to the under side of the bottom 1, and the branches 4 and 5 of which embrace the axle 2 at points near the hubs of the wheels 6 and 7. The bottom 1 of the seat is further connected with the axle 2 by the tongue 3, as follows. Near the front edge of the seat bottom 1, a clip 8 embraces the tongue and has its branches 9 and 10 bent out of the plane transverse to the tongue into a plane parallel with the under face of the bottom 1 and perforated to receive fastening screws or bolts 11. The lower end of the tongue rests on the axle 2 and is drawn into snug frictional contact with the axle by a bolt 12, through the coaction of a part of the front and rear brace.

The front and rear braces, the one to prevent the sulky from tilting too far forward and the other to prevent the sulky from tilting too far backward, are formed in a single strip, passing underneath the axle and bent upward and rearward at one end to form the front brace 13 and upward and forward at its opposite end to form the rear brace 14. The bolt 12 passes through the central portion of the said braces, to wit: through that part which connects the front and rear portions 13 and 14, and a nut 15 on the portion of the bolt which projects through the tongue serves to draw the tongue, brace and bolt into holding contact with the axle. The bolt 12 is preferably bent slightly around one side of the axle, as shown. The upper end of the front brace 13 is secured in the bight of the clip 8, between the clip and tongue and to this end the brace is curved at its end, as shown at 16. The upper end of the rear brace 14 is secured to the seat bottom by a bolt or screw 17. The portion of the brace which connects the front and rear brace portions is preferably extended in a plane substantially parallel with the seat bottom and may be provided with foot rests 18, 19, to accommodate the child facing in either of two opposite directions, the seat back being shown reversible, although this feature is not essential to my present invention.

Instead of the clip 8, a single bolt 20 may be employed to lock the seat bottom, the tongue and the front brace in assembled adjustment, as shown in Fig. 3, the brace being perforated for this purpose.

For purposes of explanation I have referred to the tongue side of the sulky as "front" and the opposite side as "rear."

The structure as a whole is very simple and inexpensive and may be knocked down and set up by unskilled as well as skilled labor. A single fastening device, either a clip or bolt, serves to lock seat, tongue and front brace in assembled adjustment and a single fastening device also serves to lock tongue and brace to the axle.

What I claim is:

In a child's sulky, the combination with the seat, axle and means for supporting the seat on the axle, of a tongue extending from seat to axle, a brace member beneath the tongue, one end of the brace terminating adjacent to the tongue opposite the edge of the seat and another portion of the brace extending adjacent to the axle, a single fastening device for holding the tongue, seat and end of the brace in assembled adjustment and a single fastening device for holding the tongue, axle and brace in assembled adjustment.

In testimony, that I claim the foregoing as my invention, I have signed my name in presence of two witnesses, this twenty-fourth day of February, 1911.

JOEL N. WHEELER.

Witnesses:
ELLA B. BAKER,
MABEL A. ANDERSON.

Copies of this patent may be obtained for five cents each, by addressing the "Commissioner of Patents, Washington, D. C."